United States Patent [19]

Anderson et al.

[11] 4,396,283
[45] Aug. 2, 1983

[54] NEGHOLD ASSEMBLY FOR PHOTOGRAPHIC PRINTER

[75] Inventors: Richard D. Anderson, Maple Grove; Larry M. Karjala, New Hope, both of Minn.

[73] Assignee: Pako Corporation, Minneapolis, Minn.

[21] Appl. No.: 349,929

[22] Filed: Feb. 18, 1982

[51] Int. Cl.³ .................... G03B 27/62; G03B 27/64
[52] U.S. Cl. .................... 355/76; 353/110; 354/275; 355/53
[58] Field of Search .................... 355/53, 75, 76, 64; 354/121, 275; 353/25, 110; 430/496

[56] References Cited

U.S. PATENT DOCUMENTS

| | | | |
|---|---|---|---|
| 3,873,194 | 3/1975 | Schwartz | 353/110 |
| 4,132,469 | 1/1979 | Harvey | 353/25 |
| 4,194,822 | 3/1980 | Sethi | 354/121 |
| 4,203,733 | 5/1980 | Clifton et al. | 355/64 |
| 4,204,733 | 5/1980 | Modney et al. | 355/64 |
| 4,208,116 | 6/1980 | Morse | 354/275 |
| 4,208,117 | 6/1980 | Harvey et al. | 354/275 |
| 4,212,673 | 7/1980 | Sethi et al. | 430/496 |
| 4,255,034 | 3/1981 | Harvey et al. | 354/121 |
| 4,264,169 | 4/1981 | Harvey | 354/121 |
| 4,268,145 | 5/1981 | Harvey et al. | 354/121 |

OTHER PUBLICATIONS

Research Disclosure, Aug. 1978, No. 17287, 1978 Industrial Opportunities Ltd., Homewell, Havant, Hampshire, United Kingdom.
Research Disclosure, Aug. 1978, No. 17289, 1978 Industrial Opportunities Ltd., Homewell, Havant, Hampshire, United Kingdom.

*Primary Examiner*—Richard A. Wintercorn
*Attorney, Agent, or Firm*—Kinney, Lange, Braddock, Westman and Fairbairn

[57] ABSTRACT

A neghold assembly permits withdrawal of a disc-like film unit from a clamping aperture assembly stationarily positioned on the photographic printer that holds a selected film frame at the print gate aperture. The disc-like film unit is held on a movable film transport assembly which engages a switching mechanism that actuates the clamping aperture assembly to an open position, releasing the disc-like film unit before the transport assembly can be moved from a print exposure cycle position. The film transport assembly includes a film transport base that is slidably attached to the printer and is positionable in the print exposure cycle position. A disc film holder, positioned on the transport base, holds the disc-like film units and rotationally indexes selected film frames to the print gate for clamping by the clamping mechanism.

37 Claims, 7 Drawing Figures

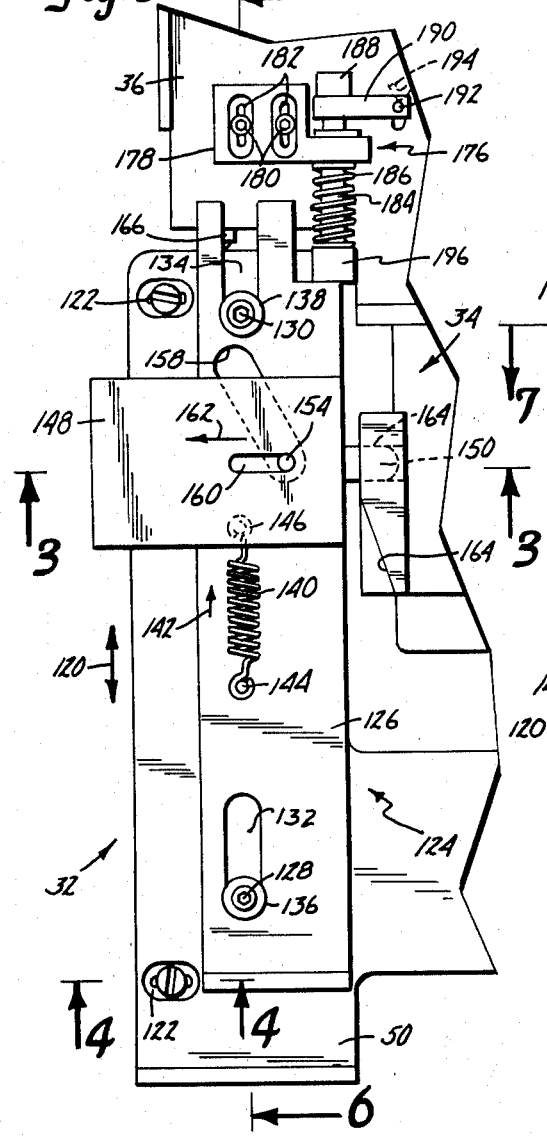
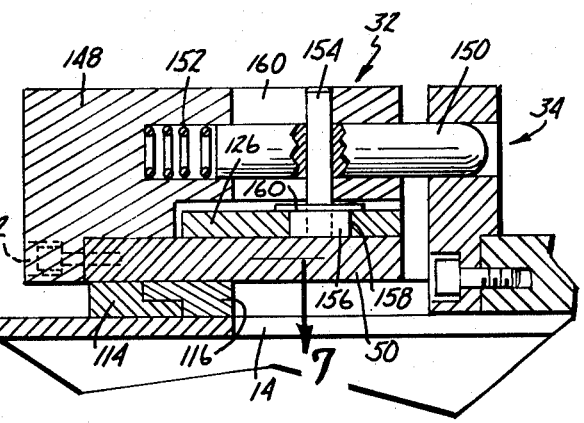
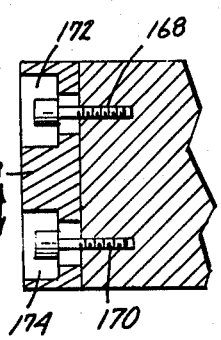
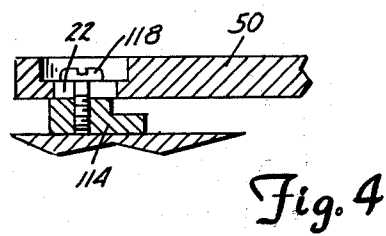
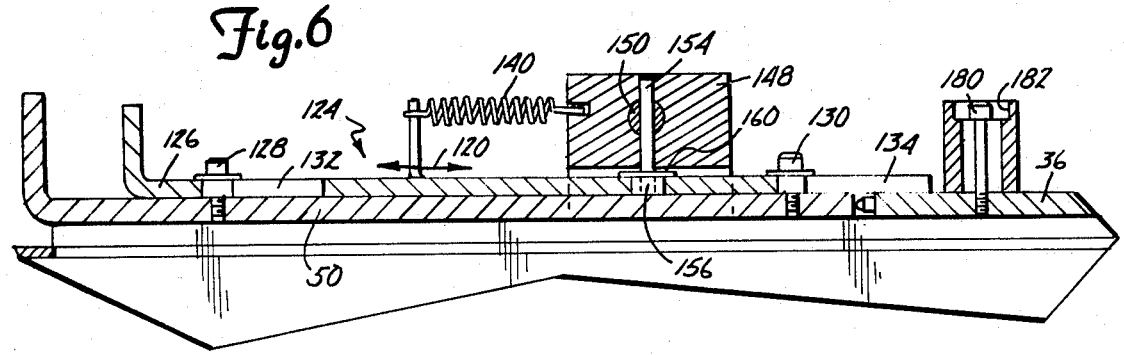

NEGHOLD ASSEMBLY FOR PHOTOGRAPHIC PRINTER

REFERENCE TO CO-PENDING APPLICATIONS

Reference is hereby made to the following co-pending patent applications filed on even date herewith and assigned to the same assignee: "Disc Film Advance Assembly" "Disc Film Frame Position Indicator" "Disc Film Holder for Photographic Printer"; and "Photographic Film Cleaner".

BACKGROUND OF THE INVENTION

1. Field of the Invention

The present invention relates to neghold assemblies for positioning and aligning selected film frames of a disc-like film unit at the print gate of a photographic printer.

2. Description of the Prior Art

Apparatus for holding and indexing conventional strip film on a photographic printer so that selected image frames are positioned at a print gate for transfer of the image to photographic print paper are well known in the art. However, this type of apparatus is wholly unsuited for positioning selected image frames of a disc-like film unit at a print gate wherein the individual image frames are located circumferentially about a central hub. Examples of a disc film unit are disclosed in the following U.S. patents:

| Inventor | U.S. Pat. No. |
|---|---|
| Sethi | 4,194,822 |
| Morse | 4,208,116 |
| Harvey et al | 4,208,117 |
| Sethi et al | 4,212,673 |
| Harvey et al | 4,255,034 |
| Harvey | 4,264,169 |
| Harvey et al | 4,268,145 |

A print gate indexing device for a disc-like film unit is disclosed in Research Disclosure of August, 1978, Disclosure No. 17287. Using the print gate indexing device, each image frame is manually advanced into the print gate. The disc-like film unit is held in a single horizontal plane while selected image frames are rotationally indexed to the print gate. However, the mechanism illustrated in Disclosure No. 17287 is unsuitable for semi-automatic or automatic photographic printers.

A rotational positioning device is also disclosed in Research Disclosure of August, 1978, Disclosure No. 17289. The rotational positioning device includes an assembly from which a central shaft extends upwardly for coaxially centering the disc-like film unit on the assembly. A pair of pins also extend upward from the assembly for extending through coorperting apertures in the hub of the disc film unit. No suitable mechanism is shown for placing the rotational positioning device in a print exposure cycle position at the print gate of a photographic printer.

The Clifton et al U.S. Pat. No. 4,203,664 and the Modney et al U.S. Pat. No. 4,202,733 illustrate a film positioning apparatus for supporting and positioning a disc-shaped film unit having a plurality of images, in several spaced work positions on a photographic printer, including one position where the film unit is supported adjacent the printing gate aperture. The apparatus disclosed in the Clifton et al and the Modney et al patents is, however, unnecessarily complicated for positioning a disc film unit adjacent the print gate aperture.

SUMMARY OF THE INVENTION

The present invention includes a neghold assembly for use in a photographic printer for printing images from selected film frames of a disc-like film unit at a print gate. A clamping mechanism clamps the selected film frames in a clamping position at the print gate and is actuated by a switching mechanism to the clamping position and to an open position. Both the clamping mechanism and the switching mechanism are stationarily attached to the photographic printer. A slidable film transport base is slidably attached to the photographic printer such that the film transport base is slid to a print exposure cycle position wherein the disc-like film unit is positioned adjacent a print gate. A disc film holder assembly attached to the transport base holds a disc-like film unit and rotationally indexes selected film frames to the print gate aperture during a print exposure cycle wherein the clamping mechanism clamps the selected film frame at the print gate. When an attempt is made to remove the film transport base from the print exposure cycle position (and before the base begins to move), the switching mechanism is actuated to place the clamping mechanism in an open position to release a disc-like film unit. Releasing a disc-like film unit before the film transport base can be removed from the print exposure cycle position eliminates damage to the image contained in the individual film frames when the disc film unit is removed after the print exposure cycle or accidentally during the print exposure cycle.

BRIEF DESCRIPTION OF THE DRAWINGS

FIG. 3 is a fragmentary cross sectional view of the locking mechanism of the present invention taken along the line 3—3 in FIG. 5;

FIG. 4 is a fragmentary cross sectional view of the adjustable rails of the present invention taken along the line 4—4 in FIG. 5;

FIG. 5 is an enlarged fragmentary top plan view of the locking mechanism and switch actuating mechanism of the present invention;

FIG. 6 is a cross sectional view of the locking mechanism of the present invention taken along the line 6—6 in FIG. 5;

FIG. 7 is a cross sectional view of the apparatus for adjusting the transport assembly in a direction generally parallel to the rails taken along the line 7—7 in FIG. 3.

DETAILED DESCRIPTION OF THE PREFERRED EMBODIMENTS

Figure 1:
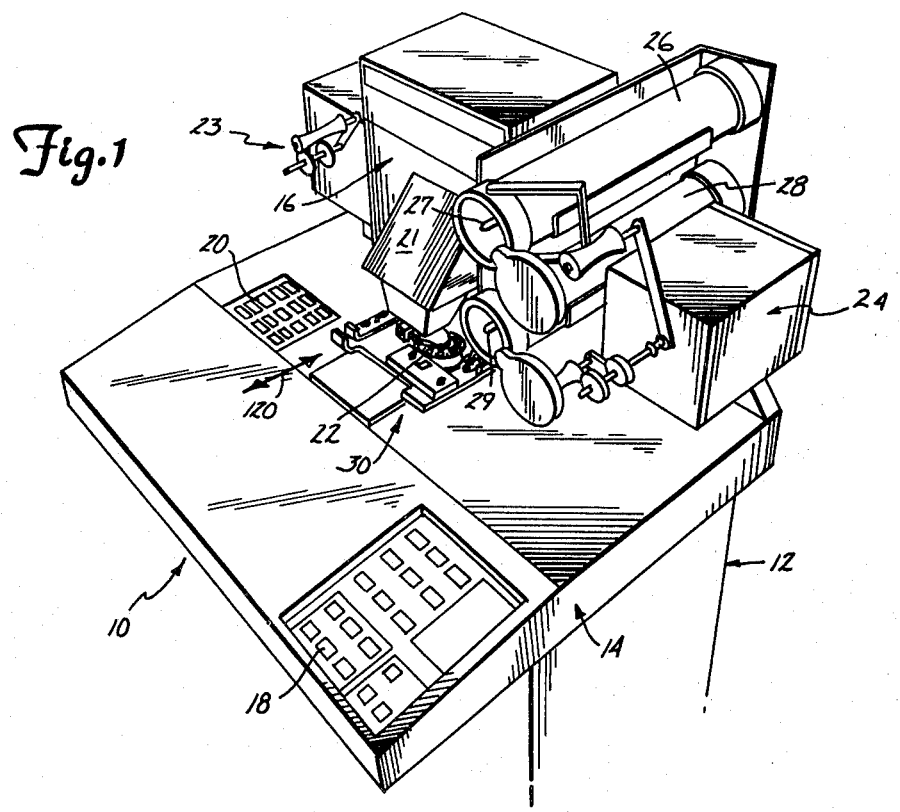
FIG. 1 is a perspective view of a photographic printer with the neghold assembly of the present invention.

Photographic printers in general are well known, a typical printer, generally indicated at 10, is illustrated in FIG. 1. The printer 10 is more fully described in the Harvey U.S. Pat. No. 4,235,551 and the Baert Patent 4,175,852, both patents being assigned to the same assignee as the present application. Briefly, the printer includes a light-tight cabinet 12 which houses most of the printer mechanism, a console 14 which is mounted on top of the cabinet 12, and a lamp house 16 mounted on the console 14. The console 14 includes a pair of panels, control panel 18 and keyboard 20, which contain various switches and keys to control and initiate various functions of the printer operation.

Lamphouse 16 contains print lamps (not shown) which provide high intensity light. The light is directed downwardly by means of a drop cone assembly 21 in an essentially uniform light distribution. The light passes through a frame of a disc-like photographic film unit 22 which is clamped at a print gate aperture and passes downwardly into a cabinet 12. The light is imaged by optics contained within the cabinet 12 onto a selected portion of a web of photosensitive print paper (not shown) within the cabinet 12.

The printer 10, briefly described above, has been used in the past exclusively for transferring images from strip-type film, as indicated by a film supply assembly 23 and a film take up assembly 24. Rolls of the strip-type film are placed on the film supply and run along the top of the console 14 and onto the film takeup assembly 24. However, this type of arrangement is wholly unsuitable for printing images from disc-like film units having a plurality of image frames positioned in a generally circular arrangement (the disc-like film units are described subsequently).

To accommodate the disc-like film units in the above-mentioned printer, and other similar printers, the apparatus of the present invention has been provided. Included on the printer are at least two tube-like members 26, 28. A first tube-like member 26 includes a plurality of disc film units mounted on a spindle 27 which have been developed by a suitable photographic developing process awaiting transfer of their images onto print paper. A second tube-like member 28 contains disc film units mounted on a spindle 29 whose images have been transferred to and printed on print paper. A disc film unit is taken from the first tube-like member 26 and placed on the printer whereupon selected images are exposed on the photosensitive print paper (not shown). After all the selected images are printed on the print paper (not shown), the disc film unit is then placed in the second tube-like member 28 for subsequent packaging and return to the customer along with the corresponding photographic prints.

Figure 2:
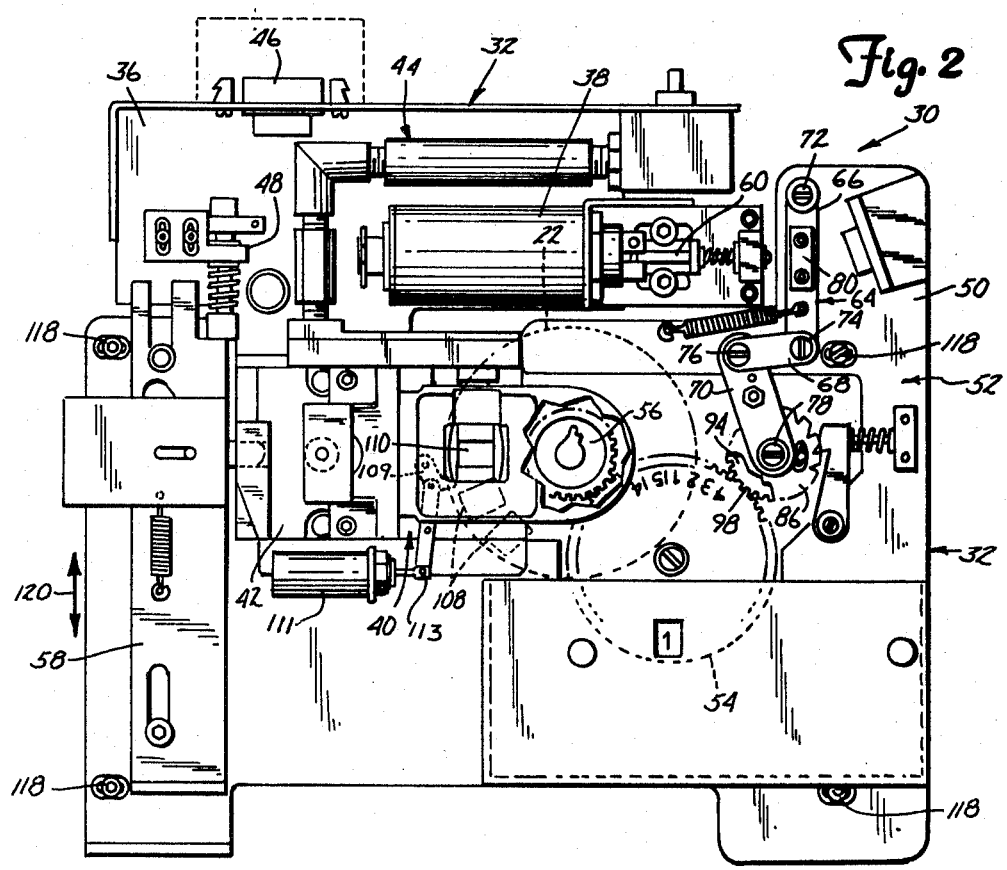
FIG. 2 is top plan view of the neghold assembly.

The disc-like film units are held in position with respect to the optical center of the printer, and individual image frames are indexed into position under the drop cone 21 by a neghold assembly 30, as more fully illustrated in FIG. 2. The neghold assembly 30 includes a movable film transport assembly 32 and a stationary film gate assembly 34. The film transport assembly 32 is movable in a generally horizontal plane along a pair of horizontal rails (described subsequently) from a position under the drop cone 21, as shown in FIG. 1 to a position closer to the front of console 14. This allows the operator to remove a film disc unit 22 from transport assembly 32 after printing, to place the completed disc on the spindle 29 within the takeup tube 28, to remove the next disc film 22 from the spindle 27 of the supply tube 26, and to place the next disc film 22 on the transport assembly 32. The transport assembly 32 is then pushed back into its normal operating position with the film disc 22 positioned with one frame below drop cone 21. FIG. 2 shows the neghold assembly 30 with the film transport assembly 32 in its fully inserted position under the drop cone 21, as shown in FIG. 1.

The film gate assembly 34 includes a film gate assembly main base 36 mounted on the paper deck 14 such that the film gate assembly 34 is optically centered to the photographic printer 10. The film gate assembly 34 includes a film advance solenoid 38, a clamping aperture assembly 40 mounted on an adjustable base 42, an air cleaning assembly 44 for directing air onto the film to clean the film, an electrical connector 46 for electrically connecting the film gate assembly 34 to the photographic printer, and a transport base sensor mechanism 48 that provides an electrical signal which indicates when the film transport assembly 32 is in position.

The film transport assembly 32 includes a slidable base 50 that is slidably attached by the rails to the console 14 and the film gate assembly 34. Attaching the film transport assembly 32 to the film gate assembly 34 and the console 14, optically aligns the film transport assembly 32 with the photographic printer 10. The film transport assembly 32 includes a film advance mechanism 52, a disc film frame position indicator 54, a disc film holder 56, and a latching assembly 58.

The film advance solenoid 38 has a plunger 60 which moves in a general direction of arrow 62 when a solenoid is energized. The plunger 60 engages pivotal linkage 64 of the film advance mechanism 52. The pivotal linkage 64 includes a first pivot arm 66, a second pivot arm 68, and a third pivot arm 70. The first pivot arm 66 is pivotally connected to the base 50 at a first fixed pivot pin 72. The pivot arm 66 is pivotally connected to the second pivot arm 68 by a first floating pivot 74 and the pivot arm 68 in turn is connected to the third pivot arm 70 by a second floating pivot 76. The third pivot arm 70 is pivotally connected to the base 50 at a second fixed pivot pin 78. The pivot pins 72, 74, 76 and 78 preferably are of a suitable ball bearing construction for long-term reliable operation of the linkage 64.

The first pivot arm 66 has a striker block 80 mounted thereon which the plunger 60 of the solenoid 38 engages when the solenoid is energized. As is easily seen from FIG. 2, when the plunger 60 moves and strikes the striker block 80, the linear movement of the plunger 60 is converted by the linkage 64 to an angular movement around the pivot pin 78. The film advance mechanism is described in further detail in the previously mentioned co-pending patent application, "Disk Film Advance Assembly", and that description is hereby incorporated by reference.

Angular movement is transmitted to a ratchet wheel 86 by the linkage 64. The ratchet wheel 86 is rotatably mounted to the base 50 coaxially with the second fixed pivot pin 78.

A ratchet gear 94 is coaxially and rotatably attached with respect to the second fixed pivot pin 78 and fixedly attached to the ratchet gear 86 for rotation therewith. When the ratchet wheel 86 is rotated the ratchet gear 94 also rotates substantially the same angular distance as the ratchet gear 86 in a general clockwise direction.

A film frame position indicator gear 98 of the film frame position indicator 54 cooperates with the ratchet gear 94. The ratchet gear 94 advances the frame position indicator gear 98 in a generally counterclockwise direction. The film frame position indicator is described in further detail in the previously-mentioned co-pending patent application, "Disc Film Frame Position Indicator", and that description is hereby incorporated by reference.

A disc frame holder gear 102 in turn cooperates with the frame position indicator gear 98 to turn the gear 102 in a generally clockwise direction, thereby indexing the disc film holder 56. The disc film unit 22 having a plurality of individual film frames 108 positioned in a circumferential manner is positioned on the disc film holder 56. The disc 22 has a plurality of notches at circumferentially spaced positions about its edge. Each of these notches has a predetermined spatial relationship to the position of an adjacent film frame on the disc 22. The disc film holder 56 is described in further detail in the previously-mentioned co-pending patent application, "Disc Film Holder for Photographic Printer", and that description is hereby incorporated by reference. Examples of the disc-like film unit 22 are disclosed in the patents which were listed in the Description of the Prior Art and which are herein incorporated by reference.

The individual film frames 108 must be optically centered with respect to a print gate aperture 110 of the aperture assembly 40 for proper transfer of the image to photographic print paper. Consequently, when a selected individual film frame 108 is indexed by the film holder 56 through the film advance mechanism 52, as described previously, it is important that the film advance mechanism 52 does not cause an individual film frame 108 to travel past the optical center of the print gate aperture 110. If the film frame 108 travels past the optical center, the individual film frame 108 must then return to the optical center of the print gate aperture 110, causing expensive delays in printing of the photographic print, or must be cropped, reducing the image that is transferred from the frame 108 to the print paper.

Precise alignment of the respective film frames 108 on the film disc 22 with the print gate aperture 110 is provided by alignment pawl 109, which engages the notch in the edge of film disc 22 which has a precisely defined spatial relationship to the position of the image area located at the print gate. In the embodiment shown in FIG. 2, position of the pawl 109 is controlled by solenoid 111 through a pivot arm 113, which is connected to the pawl 109. The solenoid 111 is actuated to withdraw the pawl 109 from engagement with the notch in the edge of the disc 22 to allow indexing of the disc 22 to bring the next film frame 108 into alignment with the print gate aperture.

As previously mentioned, the film transport assembly 32 includes the slidable base 50 that is slidably attached to the console 14 by two pair of cooperating rails 114 and 116, with one pair of the rails illustrated in FIG. 3. Preferably, the rail 114 is fixedly attached to the slidable base 50 and rail 116 is fixedly attached to the console 14.

Each of the rails 114 is adjustably attached by a pair of screws 118 which also indicate the position of the rails 114 beneath the base 50 as shown in FIG. 2. Arrow 120 indicates the direction of slidable movement of the base 50 with respect to the photographic printer, as illustrated in FIGS. 1-3.

Each of the rails 114 is adjustable with respect to the base 50 in a direction substantially transverse to the arrow 120. The screws 118 are positioned in slots 122 in the base 50 and are threadedly attached at a distal end to the rail 114 as illustrated in FIG. 4. When the screws 118 are untightened, the rail may be adjusted with respect to the base 50 to align the film transport assembly 32 with respect to the optical center of the photographic printer and the print gate assembly 34. Tightening the screws 118 fixedly attaches the rails 114 with respect to the base 50.

As the film transport assembly 32 is slid along the rails 114 and 116 to a print cycle exposure position, the present invention also provides for locking of the film transport assembly and actuating the film gate assembly 34 to a print exposure cycle mode.

The film transport assembly 32 includes a locking mechanism 124 that locks the film transport assembly when positioned in the print exposure cycle position, as illustrated in FIG. 5. The locking mechanism 124 includes a slidable arm 126 slidably positioned on the base 50, as illustrated in FIGS. 5 and 6. The arm 126 slides in a direction generally parallel to the arrow 120 by screws 128 and 130 engaging slots 132 and 134 of the arm 126. The screws 128 and 130 slidably engage the upper surface of the arm 126 through washers 136, 138, respectively, with the screws threaded ends stationarily attached to the base 50, as illustrated in FIG. 6.

A coil spring 140 biases the arm 126 in the general direction of arrow 142. The coil spring 140 is fixedly attached at an end 144 to the arm 126 and at another end 146 to a pin retaining block 148 that is stationarily attached to the base 50. When the arm 126 is pulled back in a direction opposite to arrow 142, the spring 140 will return the arm 126 to its original position against the screws 128 and 130, as illustrated in FIG. 5.

A ramp engaging pin 150 for engaging a ramp (described subsequently) is movably mounted within the block 148 and is biased outwardly therefrom by spring 152, as illustrated in FIG. 3. The ramp engaging pin 150 is held within the block by a sliding pin 154 extending vertically through the block 148 and the ramp engaging pin 150. The sliding pin 154 has a lower slot engaging portion 156 that engages the slot 158 and a flange portion 159 that separates the block 148 from the arm 126, best illustrated in FIG. 6. The upper portion of the pin 154 extends through a slot 160 in the block 148. The slots 158 and 160 are positioned such that their longitudinal axis form an acute angle toward the left of the locking mechanism 124. As best illustrated in FIG. 5, when the arm 126 is pulled in a direction opposite to the arrow 142, the pin 154 will slide up along the slot 158 of the arm 126 with the ramp engaging pin 150 moving in the general direction of arrow 162, compressing the spring 152. When the arm 126 is released, the spring 140 pulls the arm 126 in a direction of the arrow 142 and the ramp engaging pin 150 moves outwardly from the block 148 in a direction opposite to the arrow 162.

When the transport assembly 32 is moved into the print cycle position, the pin 150 engages a surface of a ramped edge 164 of the film gate assembly 34, compressing the spring 152. When the transport film assembly 32 is generally in the print exposure cycle position, the pin 150 extends into a pin receiving aperture 164 in the film gate assembly 34. A ball plunger 166, biased outwardly from the film gate assembly base 36, biases a forward end of the base 50 in a direction generally opposite to the arrow 142 retaining the ramp engaging pin 150 against a side of the aperture 164. With the ball plunger 166 holding the ramp engaging pin 150 against the side of the aperture 164, the transport assembly 32 is held in a secure manner in the print cycle exposure position.

In addition, the transport assembly is also adjustable in a direction of the arrow 120, for example, to initially adjust the transport assembly with respect to the optical center of the photographic printer. As illustrated in FIG. 7, a pair of screws 168, 170 extend through slots 172, 174 in the block 148 and are fixedly attached at their distal ends to the base 50. Untightening the screws 168, 170 permit the block 148 to be adjusted in the general direction of the arrow 120 thereby permitting adjustment of the pin 150 and therefore the transport assembly 32 with respect to the film gate assembly 34 and the optical center of the photographic printer.

A switch actuating mechanism 176 adjustably attached to the base 36 of the film gate assembly 34 actuates the film gate assembly 34 and the photographic printer to a print cycle exposure mode. The switch actuating assembly 176 includes a main block member 178 adjustably attached to the film gate assembly 34 through a pair of slot engaging screws 180. The screws 180 engage the slots 182 in the block 178 and are threadably attached to the base 36 at their distal ends, as illustrated in FIGS. 5 and 6. A switch actuating pin 184 extends and is movable through the block 178. The pin 184 is biased by a spring 186 toward the film transport base 50. The pin 184 has a locking nut 188 at an opposite end for fixing of the length that the pin 184 extends from the block 178 towards the arm 126 of the transport assembly 32. A switch actuating arm 190 fixedly attached to the pin 184 at one end has a downwardly extending switch engaging pin 192 which engages and actuates a suitable switch 194, indicated by broken line, beneath the base 36 of the film gate assembly 34. The nut 188 also adjusts the contact between switch engaging pin 192 and the switch 194.

When the film transport base 32 is placed in the print exposure cycle position, the arm 126 engages a pin end 196 of the pin 184 moving the pin 184 against the biasing force of spring 186. The pin end 196 is adjustable for adjusting the point of contact between the arm 126 and the pin end 196. The arm 190 and the pin 192 are moved with the pin 184 to actuate the switch 194 thereby placing the film gate assembly 34 and the photographic printer in the print exposure cycle mode.

To remove the film transport assembly 32 from the print exposure cycle position, the arm 126 is pulled in a general direction opposite to the arrow 142 extracting the ramp engaging pin 150 from the aperture 164. The transport assembly is removed by sliding the base 50 along the rails 114 and 116 away from the switch actuating mechanism 176. As soon as the arm 126 is moved and before film transport assembly 32 is removed, the switch 194 changes states which plates the photographic printer and the film gate assembly 34 is a nonprinting mode. Placing the film gate assembly in a nonprinting mode, releases the disc film unit 22 from a clamping engagement with the aperture assembly 40, as described in the co-pending patent application, "Disc Film Holder for Photographic Printer", which has been previously incorporated by reference. Consequently, the film transport assembly 32 can be removed from a print cycle exposure position without damaging the disc film unit 22. As is easily understood from the above description, the disc film unit 22 will be released by the aperture assembly 40 at either the end of a print exposure cycle or during a print exposure cycle if an attempt is made to remove the film transport assembly 32 either by accident or deliberately.

The present invention also provides a further advantage in eliminating accidental removal of the film transport assembly 32 from the print exposure cycle position. To place the film transport assembly 32 in the print cycle position, the arm 126 does not have to be actuated in a direction opposite to the arrow 142. The film transport assembly 32 may merely be slid along the rails 114 and 116 with the ramp engaging pin 150 engaging the ramp 164 and then being biased into the aperture 164. However, to remove the film transport assembly 32 from the print cycle exposure position, the arm 126 has to be intentionally pulled back in a direction opposite to arrow 142 to release the pin 150 from the aperture 164. This is quite helpful if the operator accidentally pulls back on the film transport assembly 32 during a print exposure cycle.

CONCLUSION

The present invention provides a simple and efficient apparatus for placing a disc film unit on a disc film holder and positioning the disc film unit in a print exposure cycle position aligned with the print gate of a photographic printer. In addition, the present invention provides a safety measure for eliminating damage to the disc film unit when removing the film transport assembly and for eliminating accidental removal of the film transport assembly. The ball plunger 166 biasing the pin 150 against the aperture 164 provides a manner of consistent positioning of the film transport assembly from front to back when positioned in the print exposure cycle position.

Although the present invention has been described with reference to preferred embodiments, workers skilled in the art will recognize that changes may be made in form and detail without departing from the spirit and scope of the invention.

What is claimed is:

1. A neghold assembly for use in a photographic printer for printing images from selected film frames of a disc-like film unit at a print gate, the assembly comprising:
   means for clamping the selected film frames in a clamping position at the print gate and stationarily attached to the photographic printer;
   switching means for actuating the means for clamping to an open position and stationarily attached to the photographic printer;
   a movable film transport base;
   means for movably attaching the film transport base to the photographic printer to a print exposure cycle position;
   means for holding the disc-like film unit and rotationally indexing selected film frames to the print gate and attached to the movable base such that the means for clamping clamps the selected film frames at the print gate aperture; and
   means for actuating the switching means attached to the movable base such that before the base is slid from the print exposure cycle position, the means for clamping is actuated to the open position releasing the disc-like film unit.

2. The assembly of claim 1 wherein the means for movably attaching the film transport base to the photographic printer includes a plurality of cooperating upper and lower rails slidably engaging each other, the upper rails being fixedly attached to the base and the lower rails being fixedly attached to the photographic printer.

3. The assembly of claim 1 wherein the means for actuating the switching means includes:
   a stationary base member stationarily attached to the photographic printer;
   a film transport base engaging member having a first end adapted for engaging the transport base and a second end and movably positioned within the stationary base member and biased toward the transport base from the stationary base member;
   biasing means for biasing the film transport base engaging member; and a switch engaging member attached to the second end of the film transport base engaging member for actuating the switching means when the base is slid into the print exposure cycle position and engages the film transport engaging member.

4. The assembly of claim 2 and further including locking means for locking the film transport assembly in the print cycle exposure position.

5. The assembly of claim 4 wherein the locking means includes:
a stationary locking member stationarily positioned with respect to the photographic printer having a pin receiving aperture; and
a locking pin assembly stationarily attached to the base and having a movable locking pin for insertably engaging the pin receiving aperture when the film transport base is slid into the print exposure cycle position.

6. The assembly of claim 5 wherein the locking means further includes:
a slidable arm slidably attached to the film transport base and movable to a first and second position with respect to the locking pin assembly; and
means for moving the locking pin to a locking position and to an unlocking position such that when the slidable arm is moved to the first position the pin member is moved to an unlocking position and when the slidable arm is moved to the second position the pin member is moved to a locking position.

7. The assembly of claim 6 wherein the slidable arm is biased to the locking position.

8. The assembly of claim 7 wherein the locking pin assembly includes a housing and a sliding pin extends through the locking pin and through a first slot in the housing with an upper portion and through a second slot in the slidable arm angularly positioned with respect to the first slot such that when the slidable arm is slid with respect to the film transport base, the locking pin member is moved to an unlocking position.

9. The assembly of claim 6 wherein the locking pin is biased to the locking position.

10. The apparatus of claim 5 wherein the stationary base member includes a first pin engaging ramped edge for engaging the locking pin as the film transport assembly is moved to the print cycle exposure, moving the locking pin to an unlocking position until the locking pin approaches the pin receiving aperture for insertion into the aperture to a locking position.

11. A neghold assembly having a film transport assembly movable to and from a print exposure cycle position for positioning selected film frames of a disc film unit at a print gate of a photographic printer, the assembly comprising:
a film transport assembly base;
means for holding and indexing the selected film frames of the disc film unit to the print gate position and positioned on the film transport base;
means for moving the film transport base to and from the print exposure cycle position;
first adjustment means for adjusting the film transport base in a first direction such that the selected film frame is alignable in the first direction with the print gate in the print exposure cycle position; and
second adjusting means for adjusting the film transport in a second direction substantially transverse to the first direction such that the selected film frame is alignable in a second direction with the print gate in the print exposure cycle position.

12. The assembly of claim 11 and further including locking means for locking the film transport assembly in the print cycle exposure position.

13. The assembly of claim 12 wherein the locking means includes:
a stationary locking member stationarily positioned with respect to the photographic printer having a pin receiving aperture; and
a locking pin assembly stationarily attached to the base and having a movable locking pin for insertably engaging the pin receiving aperture when the film transport base is slid into the print exposure cycle position.

14. The assembly of claim 13 wherein the locking means further includes:
a slidable arm slidably attached to the film transport base and movable to a first and second position with respect to the locking pin assembly; and
means for moving the locking pin to a locking position and to an unlocking position such that when the slidable arm is moved to the first position the pin member is moved to an unlocking position and when the slidable arm is moved to the second position the pin member is moved to a locking position.

15. The assembly of claim 14 wherein the slidable arm is biased to the locking position.

16. The assembly of claim 15 wherein the locking pin assembly includes a housing and a sliding pin extends through the locking pin and through a first slot in the housing with an upper portion and through a second slot in the slidable arm angularly positioned with respect to the first slot such that when the slidable arm is slid with respect to the film transport base, the locking pin member is moved to an unlocking position.

17. The assembly of claim 14 wherein the locking pin is biased to the locking position.

18. The apparatus of claim 13 wherein the stationary base member includes a first pin engaging ramped edge for engaging the locking pin as the film transport assembly is moved to the print cycle exposure, moving the locking pin to an unlocking position until the locking pin approaches the pin receiving aperture for insertion into the aperture to a locking position.

19. The assembly of claim 13 wherein the second adjusting means includes a plurality of screws extending through adjusting slots in the pin assembly and threadably engaging threaded apertures in the film transport base.

20. The assembly of claim 11 wherein the means for moving the film transport base includes a plurality of cooperating upper and lower rails slidably engaging each other, the upper rails being adjustably attached to the base and the lower rails being fixedly attached to the photographic printer.

21. The assembly of claim 20 wherein the first adjusting means includes a plurality of screws extending through a plurality of slots in the transport base and threadably attaching threaded apertures in the upper rails.

22. A slidable disc film transport assembly for indexing selected film frames of a disc film unit to a print gate of a photographic printer, the assembly comprising:
a slidable base;
means for slidably attaching the base to the photographic printer to permit the slidable base to be moved to a disc film printing position;
a rotatable disc film holder mounted on the slidable base for rotationally indexing selected film frames to a print gate aperture when the slidable base is in the disc film printing position;

film indexing drive means mounted on the photographic printer for providing a linear motive force;

pivotal linkage means mounted on the slidable base for converting the linear motive force to a rotational motive force; and means for transferring the rotational motive force to the rotatable disc film holder to cause indexing of the selected film frame by rotation of the rotatable disc film holder to index a selected film frame into alignment with the print gate.

23. The assembly of claim 22 wherein the means for slidably attaching the slidable base to the photographic printer includes a plurality of cooperating upper and lower rails slidably engaging each other, the upper rails being fixedly attached to the base and the lower rails being fixedly attached to the photographic printer.

24. The assembly of claim 22 and further including locking means for locking the film transport assembly in the printing position.

25. The assembly of claim 24 wherein the locking means includes:

a stationary locking member stationarily positioned with respect to the photographic printer having a pin receiving aperture; and a locking pin assembly stationarily attached to the base and having a movable locking pin for insertably engaging the pin receiving aperture when the film transport base is slid into the printing position.

26. The assembly of claim 25 wherein the locking means further includes:

a slidable arm slidably attached to the film transport base and movable to a first and second position with respect to the locking pin assembly; and means for moving the locking pin to a locking position and to an unlocking position such that when the slidable arm is moved to the first position the pin member is moved to an unlocking position and when the slidable arm is moved to the second position the pin member is moved to a locking position.

27. The assembly of claim 26 wherein the slidable arm is biased to the locking position.

28. The assembly of claim 27 wherein the locking pin assembly includes a housing and a sliding pin extends through the locking pin and through a first slot in the housing with an upper portion and through a second slot in the slidable arm angularly positioned with respect to the first slot such that when the slidable arm is slid with respect to the film transport base, the locking pin member is moved to an unlocking position.

29. The assembly of claim 26 wherein the locking pin is biased to the locking position.

30. The apparatus of claim 25 wherein the stationary base member includes a first pin engaging ramped edge for engaging the locking pin as the film transport assembly is moved to the print cycle exposure, moving the locking pin to an unlocking position until the locking pin approaches the pin receiving aperture for insertion into the aperture to a locking position.

31. A neghold assembly for use in a photographic printer for printing an image from a selected film frame of a disc-like film unit at a print gate, the assembly comprising:

clamping means stationarily attached to the photographic printer for clamping the selected film frame at the print gate in a clamped state and having an unclamped state in which the film frame is not clamped;

a movable film transport base;

means for movably attaching the film transport base to the photographic printer;

means attached to the movable base for holding the disc-like film unit and rotationally indexing the selected film frame to the print gate;

releasable locking means for locking the transport base in a print exposure cycle position and be releasable to permit movement of the transport base from the print exposure cycle position; and means responsive to the releasable locking means for causing the clamping means to have the unclamped state when the releasable locking means is released.

32. The assembly of claim 31 wherein the means responsive to release the releasable lock means includes:

switching means for actuating the means for clamping to the unclamped position and stationarily attached to the photographic printer; and means for actuating the switching means attached to the movable base such that before the base is slid from the print exposure cycle position, the means for clamping is caused to have the unclamped state releasing the disc-like film unit.

33. The assembly of claim 32 wherein the means for actuating the switching means includes:

a stationary base member stationarily attached to the photographic printer;

a film transport base engaging member having a first end adapted for engaging the transport base and a second end and movably positioned within the stationary base member and biased toward the transport base from the stationary base member;

first biasing means for biasing the film transport base engaging member; and a switch engaging member attached to the second end of the film transport base engaging member for actuating the switching means when the base is slid into the print exposure cycle position and engages the film transport engaging member.

34. The assembly of claim 31 wherein the releasable locking means includes:

a stationary locking member stationarily positioned with respect to the photographic printer having a pin receiving aperture; and a locking pin assembly stationarily attached to the base and having a movable locking pin for insertably engaging the pin receiving aperture when the film transport base is slid into the print exposure cycle position.

35. The assembly of claim 34 wherein the releasable locking means further includes:

a slidable arm slidably attached to the film transport base and movable to a first and second position with respect to the locking pin assembly; and means for moving the locking pin to a locking position and to an unlocking position such that when the slidable arm is moved to the first position the pin member is moved to an unlocking position and when the slidable arm is moved to the second position the pin member is moved to a locking position.

36. The assembly of claim 35 wherein the slidable arm is biased to the locking position.

37. The assembly of claim 34 and further including second biasing means for biasing the movable locking pin against a surface of the pin receiving aperture when the film transport base is in the print exposure cycle position.

* * * * *